US012674570B1

(12) United States Patent
Hwang

(10) Patent No.: US 12,674,570 B1
(45) Date of Patent: Jul. 7, 2026

(54) GARDEN LIGHT

(71) Applicant: METROMAX AMERICA CORPORATION, Rowland Heights, CA (US)

(72) Inventor: Christina Hwang, Rowland Heights, CA (US)

(73) Assignee: METROMAX AMERICA CORPORATION, Rowland Heights, CA (US)

( * ) Notice: Subject to any disclaimer, the term of this patent is extended or adjusted under 35 U.S.C. 154(b) by 0 days.

(21) Appl. No.: 19/312,973

(22) Filed: Aug. 28, 2025

(51) Int. Cl.

| | |
|---|---|
| ***F21S 9/03*** | (2006.01) |
| ***F21S 2/00*** | (2016.01) |
| ***F21V 15/01*** | (2006.01) |
| ***F21V 21/08*** | (2006.01) |
| ***F21V 23/04*** | (2006.01) |
| ***F21V 23/06*** | (2006.01) |
| *F21W 131/109* | (2006.01) |
| *F21Y 115/10* | (2016.01) |

(52) U.S. Cl.
CPC .............. *F21V 23/06* (2013.01); *F21S 2/005* (2013.01); *F21S 9/037* (2013.01); *F21V 15/01* (2013.01); *F21V 21/0824* (2013.01); *F21V 23/04* (2013.01); *F21V 2200/40* (2015.01); *F21W 2131/109* (2013.01); *F21Y 2115/10* (2016.08)

(58) Field of Classification Search
CPC .... F21S 6/00; F21S 6/004; F21S 6/005; F21S 8/08; F21S 8/081; F21S 8/083; F21S 9/00; F21S 9/02; F21S 9/03; F21S 9/035; F21S 9/037; F21S 2/00; F21S 2/005; F21V 23/06; F21W 2131/10; F21W 2131/109
See application file for complete search history.

(56) References Cited

U.S. PATENT DOCUMENTS

| | | | | |
|---|---|---|---|---|
| 8,534,867 | B1 * | 9/2013 | Beadle | F21V 17/002 362/153.1 |
| 9,420,661 | B2 * | 8/2016 | Martzall | F21V 31/005 |
| 10,240,734 | B1 * | 3/2019 | Hwang | F21V 21/30 |
| 11,698,181 | B1 | 7/2023 | Hwang | |
| 2005/0135101 | A1 * | 6/2005 | Richmond | F21S 9/035 362/276 |
| 2012/0069571 | A1 * | 3/2012 | Hochstein | F21V 29/89 362/249.02 |
| 2012/0188752 | A1 * | 7/2012 | Chen | F21V 23/009 362/183 |

* cited by examiner

*Primary Examiner* — Thien M Le
*Assistant Examiner* — April A Taylor
(74) *Attorney, Agent, or Firm* — Workman Nydegger

(57) ABSTRACT

A garden light includes a translucent hollow column, a solar light emitting module mounted onto the top end of the hollow column, and a first light emitting module detachably assembled to the bottom side of the solar light emitting module. Users can selectively use an LED at the bottom side of the solar light emitting module to emit light in the hollow column, or assemble the first light emitting module to let the first light emitting module emit light in the hollow column after the solar light emitting module receives electric power.

8 Claims, 8 Drawing Sheets

GARDEN LIGHT

TECHNICAL FIELD OF THE DISCLOSURE

The present disclosure relates to a garden light, and more particularly to a garden light with a solar light emitting module and a detachable first light emitting module, which offers more options of use to users.

DESCRIPTION OF RELATED ART

The present disclosure is an improvement over the prior art of U.S. Pat. No. 11,698,181 B1, entitled "Garden Light with Modular Design for Convenient Packaging and Transportation" which primarily incorporates a modular design of at least two garden lights of different sizes packaged together to simplify the process of separate packaging and reduce the transportation volume and transportation cost.

The aforementioned patent, when actually implemented, does indeed achieve the expected effects. However, the at least two different sizes of garden lights, aside from their differing sizes, are substantially similar in their lighting methods, lacking in variety. In view of this, the present disclosure aims to improve the lighting method to create more diverse lighting options for users to choose from. After extensive research and testing, the present disclosure was finally designed.

SUMMARY OF THE DISCLOSURE

The objective of the present disclosure is to provide a garden light, which includes a hollow column, a solar light emitting module, and a first light emitting module, wherein the hollow column has a bottom end and a top end, the top end is provided for mounting the solar light emitting module, and a translucent interior is defined between the top end and the bottom end; the solar light emitting module includes a casing having a top side and a bottom side, the top side is provided with a solar panel, a battery and a circuit board are accommodated between the top side and the bottom side and electrically connected to the solar panel, and the bottom side is provided with at least one LED electrically connected to the circuit board, so that after the at least one LED emits light downward, the light shines from the inside out through the interior. The present disclosure is characterized in that the bottom side of the casing is further provided with a first assembly part, a circuit breaker electrically connected to the circuit board, and a plurality of conductive parts electrically connected to the circuit board; the first light emitting module has a top side, and a light emitting part extends downward from the top side, wherein the top side is provided with a second assembly part configured opposite to the first assembly part of the casing, the second assembly part is detachably assembled with the first assembly part, the top side is provided with a plurality of conductive terminal configured to be opposite to the conductive parts of the casing respectively; and after the second assembly part of the first light emitting module is assembled with the first assembly part of the casing, the top side of the first light emitting module abuts against the circuit breaker to turn off the at least one LED, and the plurality of conductive terminals of the first light emitting module is in upward contact with the conductive parts of the casing respectively to allow the first light emitting module to receive electric power from the battery of the solar light emitting module, so as to enable the light emitting part of the first light emitting module to emit light in the interior of the hollow column.

With the aforementioned structure, users can choose to assemble a solar light emitting module into a hollow column and use the LED of the solar light emitting module to emit light, or assemble a first light emitting module at the bottom of the solar light emitting module and then combine it with the hollow column to allow the first light emitting module to emit light, thereby making the garden light exhibit different light emitting modes with changes.

It is noteworthy that the present disclosure is not only applicable to garden lights of at least two different sizes, but also applicable to a single garden light in terms of composition and product positioning, providing users with more options.

The technical characteristics of this disclosure will become apparent with the detailed description of preferred embodiments accompanied with the illustration of related drawings as follows.

DETAILED DESCRIPTION OF THE DISCLOSURE

Figure 1:
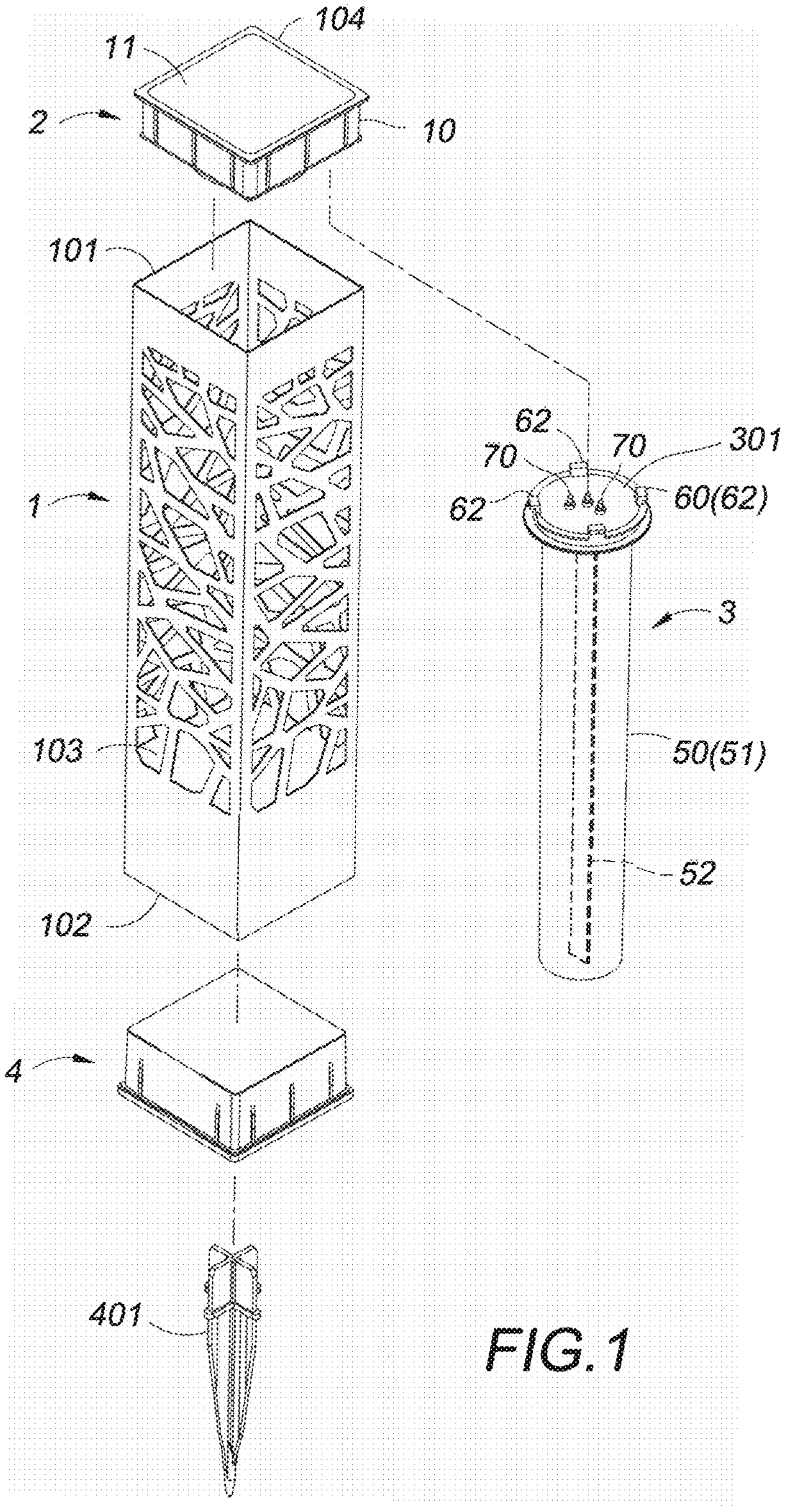
FIG. 1 is an exploded view of the present disclosure.
Figure 2:
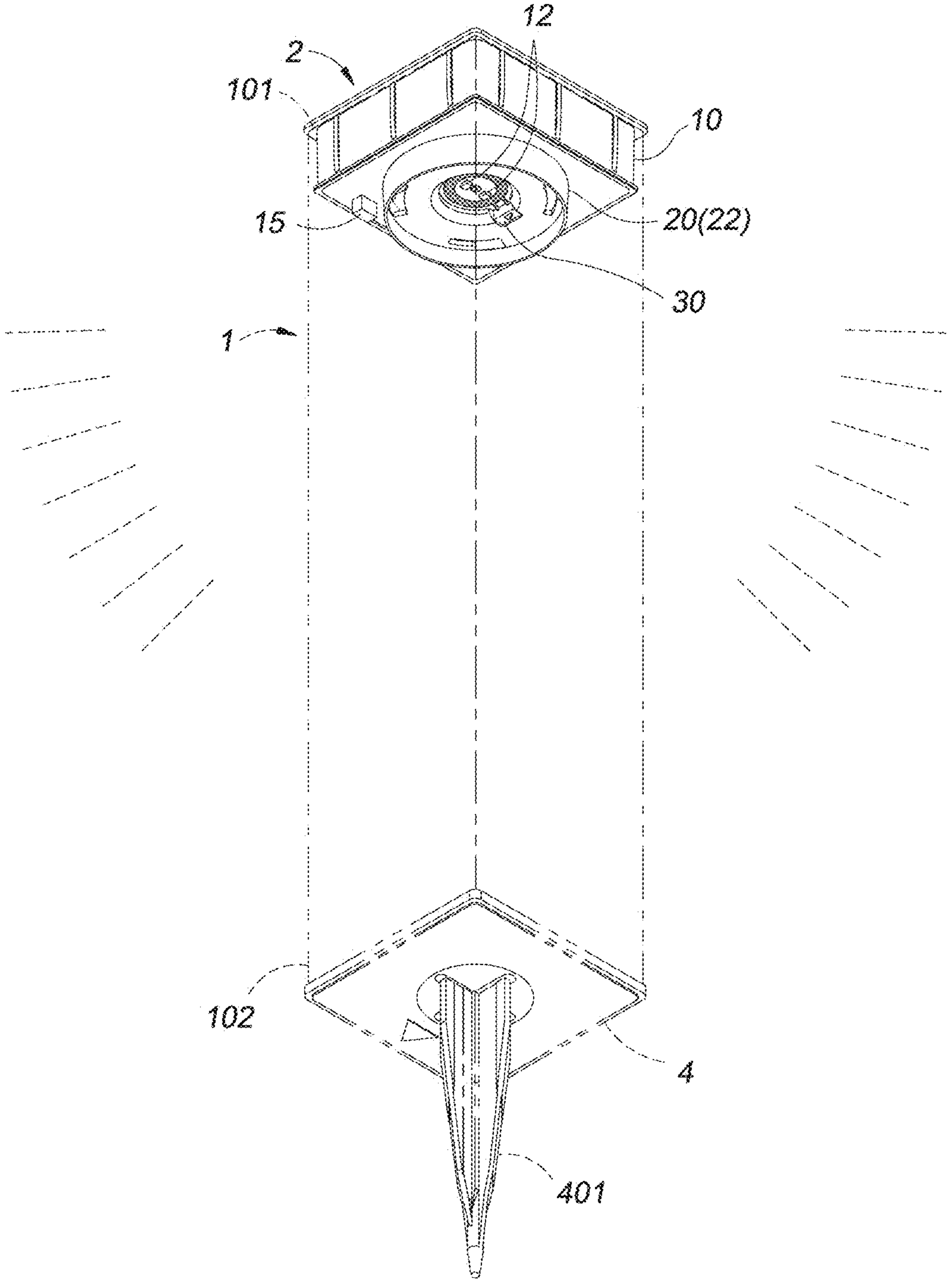
FIG. 2 is a schematic view showing the light emission of a solar light emitting module of the present disclosure.
Figure 3:
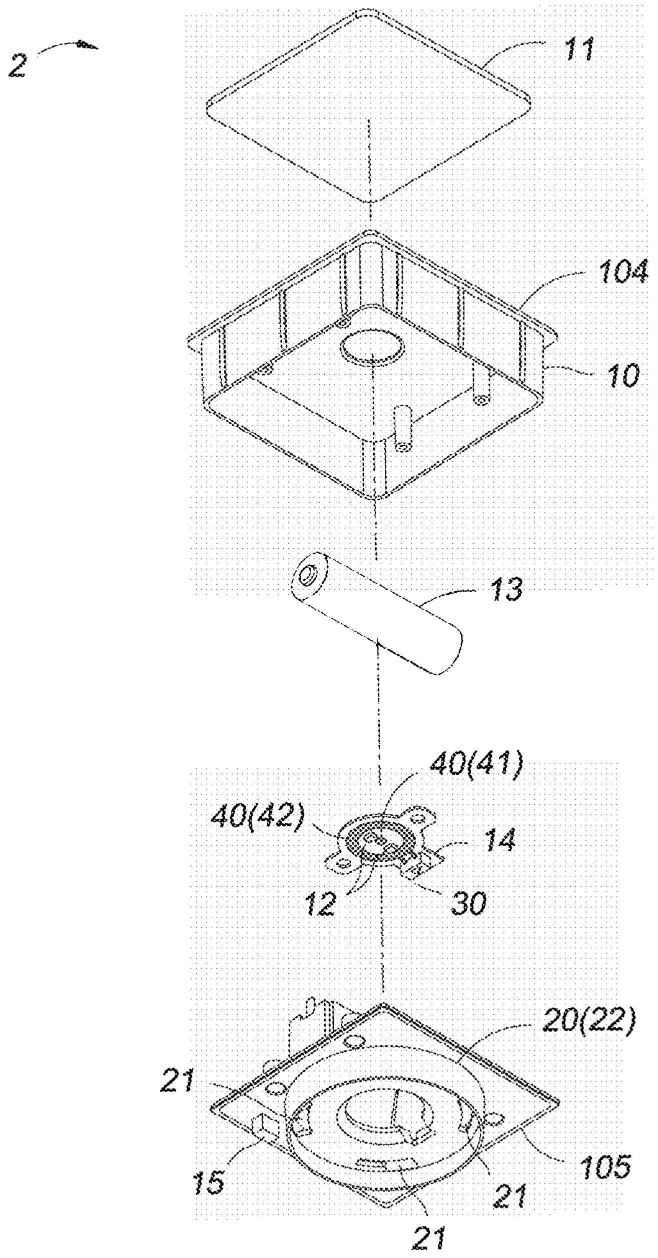
FIG. 3 is an exploded view of a solar light emitting module of the present disclosure.

With reference to FIGS. 1 to 3 for a garden light of the present disclosure, the garden light includes a hollow column 1, a solar light emitting module 2, a first light emitting module 3, and a base 4.

The top end 101 of the hollow column 1 is provided for accommodating the solar light emitting module 2, while the bottom end 102 is provided for accommodating the base 4. A translucent interior 103 is formed between the top end 101 and the bottom end 102. In the figure, a ground plug 401 is detachably provided below the base 4 for inserting into the ground to secure the garden light.

The solar light emitting module 2 includes a casing 10. A solar panel 11 is provided on the top side 104 of the casing 10. At least one LED 12 is provided on the bottom side 105 of the casing 10. A battery 13 and a circuit board 14 are accommodated between the top side 104 and the bottom side 105. The solar panel 11, LED 12, battery 13, and circuit board 14 are electrically connected to each other, allowing the LED 12 to receive electric power from the battery 13 and emit light downward, and the light is passed from the inside out through the interior 103.

Figure 4:
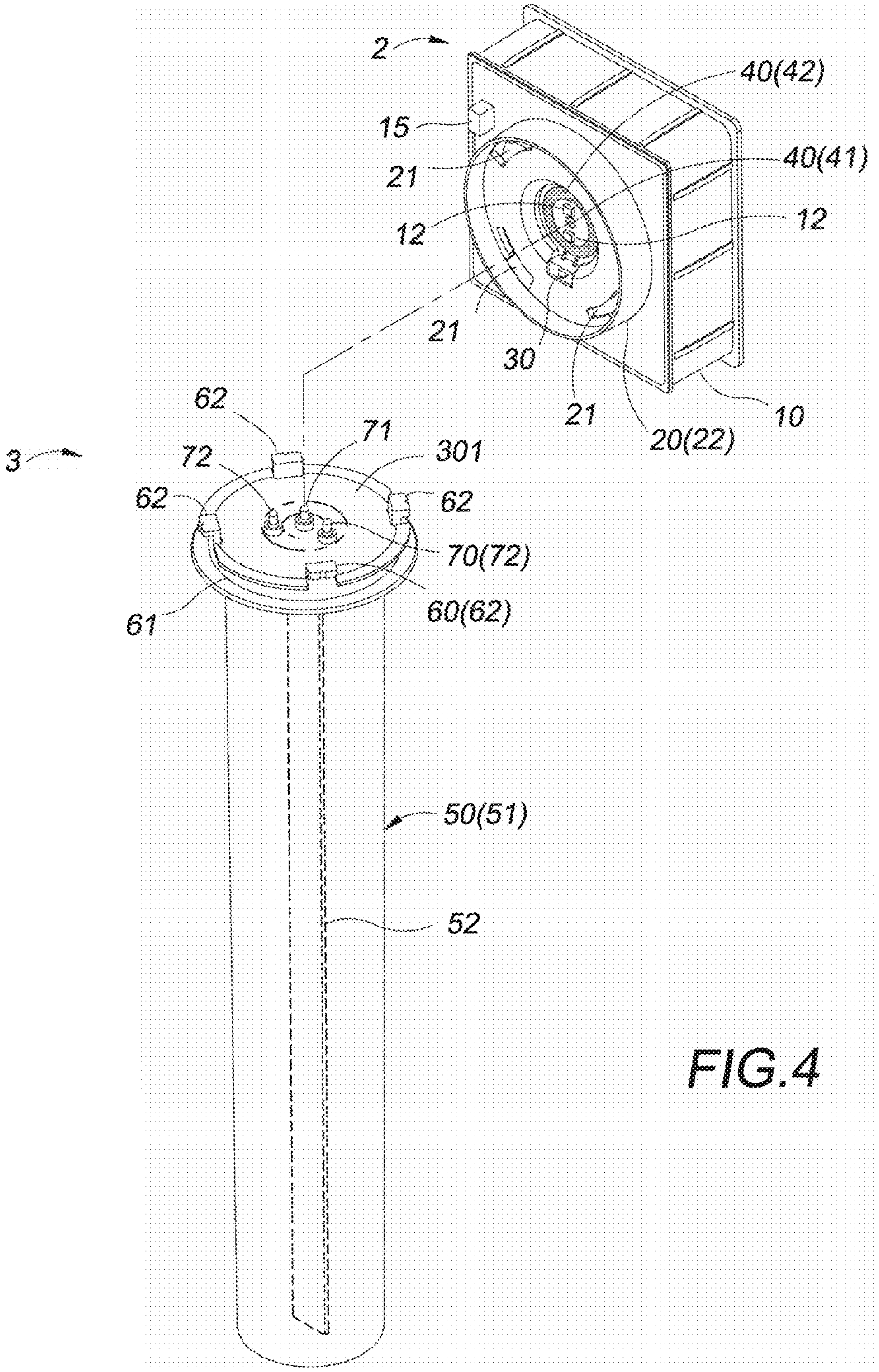
FIG. 4 is a schematic disassembly view showing a solar light emitting module and a first light emitting module of the present disclosure.

As shown in FIGS. 2 to 4, the bottom side 105 of the casing 10 is further provided with a first assembly part 20, a circuit breaker 30 electrically connected to the circuit board 14, and a conductive part 40 electrically connected to the circuit board 14.

The first light emitting module 3 has a top side 301 and a light emitting part 50 extending downward from the top side 301. A second assembly part 60 is provided on the top side 301 and configured to be opposite to the first assembly part 20 of the casing 10. The second assembly part 60 is detachably assembled with the first assembly part 20. A plurality of conductive terminals 70 is provided on the top side 301 and configured to be opposite to the conductive parts 40 of the casing 10 respectively.

When users want to use the first light emitting module 3 to emit light, they can first remove the solar light emitting module 2 from the top end 101 of the hollow column 1, and then assemble the second assembly part 60 of the first light emitting module 3 with the first assembly part 20 of the casing 10.

Figure 5:
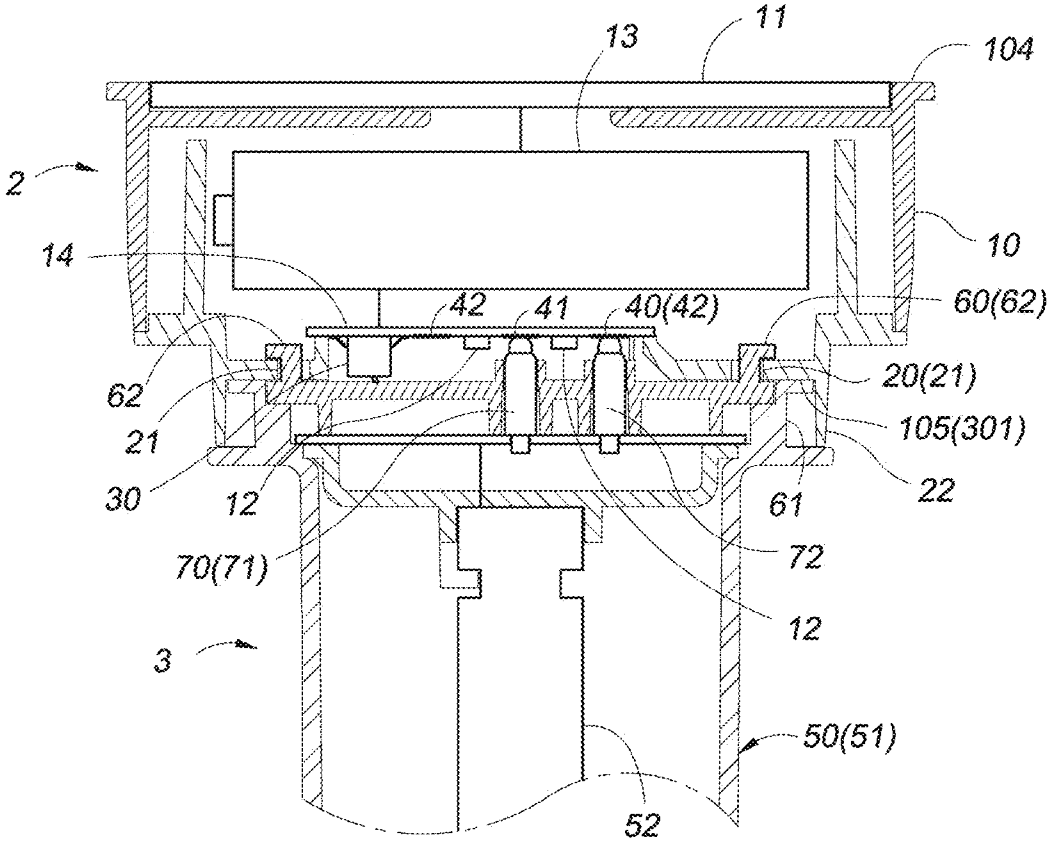
FIG. 5 is a schematic structural view showing the assembly of a solar light emitting module and a first light emitting module of the present disclosure.
Figure 6:
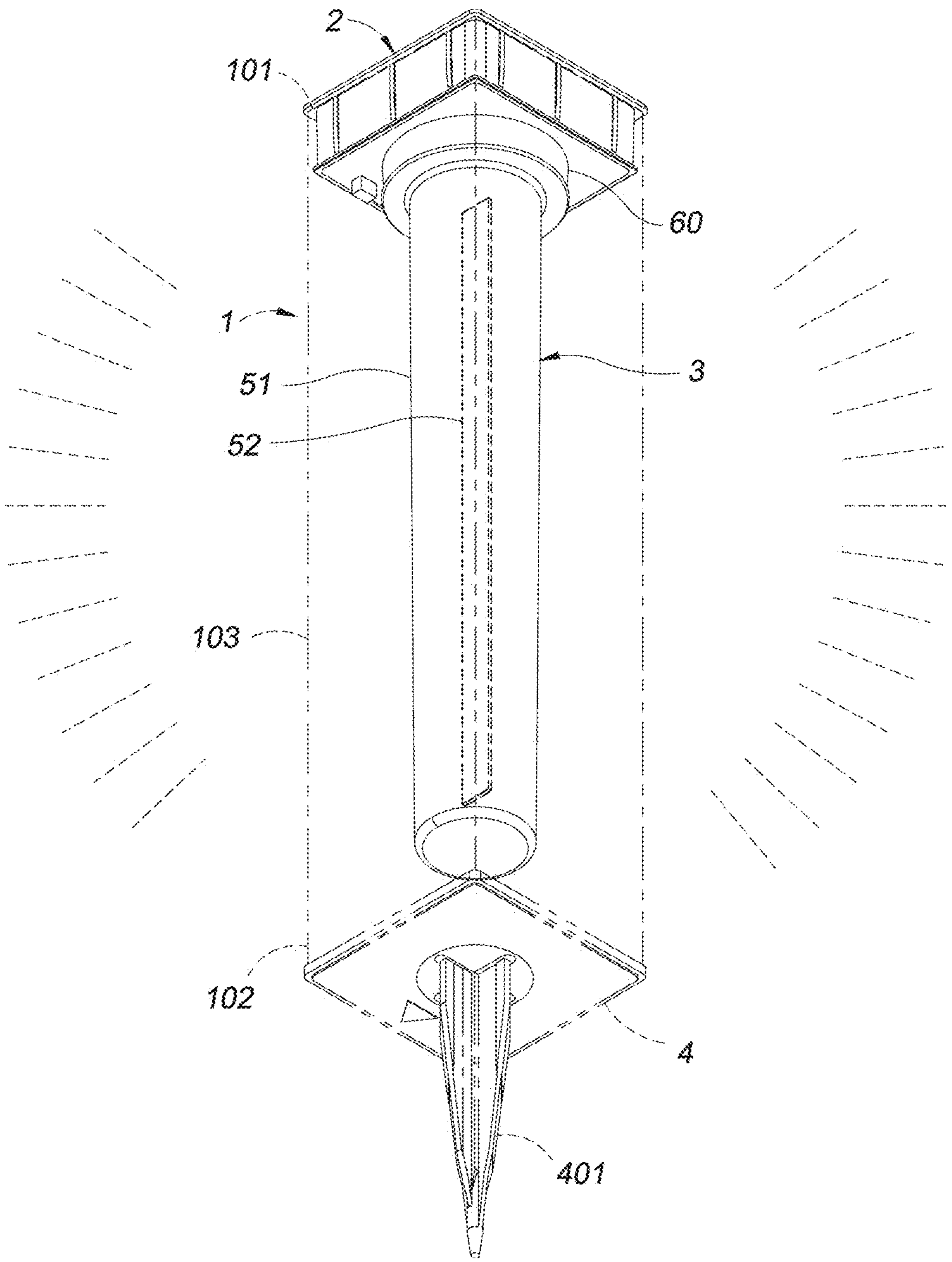
FIG. 6 is a schematic view showing the assembly of a first light emitting module of the present disclosure.

As shown in FIGS. 4 to 6, during assembling, the top side 301 of the first light emitting module 3 abuts against the circuit breaker 30 to disconnect the electric power supplied by the battery 13 to the LED 12 through the circuit breaker 30, so as to turn off the LED 12. Furthermore, the plurality of conductive terminals 70 of the first light emitting module 3 is in upward contact with the conductive part 40 of the casing 10, allowing the first light emitting module 3 to receive electric power from the battery 13.

After the first light emitting module 3 is assembled with the solar light emitting module 2, the first light emitting module 3 can be placed in the interior 103 of the hollow column 1. The solar light emitting module 2 can then be reassembled at the top end 101 of the hollow column 1. This arrangement allows the light emitting part 50 of the first light emitting module 3 to emit light within the interior 103 of the hollow column 1. Therefore, users can choose to emit light by the LED 12 of the solar light emitting module 2, or to emit light by the first light emitting module 3, allowing the garden light to have different light emitting modes and changes.

In the embodiment as shown in the figures, the conductive part 40 of the solar light emitting module 2 includes a first electrode 41 located at the middle of the bottom side 105 of the casing 10, and a ring-shaped second electrode 42 located around the first electrode 41.

The first assembly part 20 includes a plurality of buckle slots 21 circularly arranged with the first electrode 41 as the center and dividing the entire 360 degrees into equal parts, and a ring wall 22 located around the plurality of buckle slots 21. The ring wall 22 is formed by extending downward from the bottom side 105 of the casing 10.

The conductive terminal 70 of the first light emitting module 3 includes a first conductive terminal 71 configured to be opposite to the first electrode 41 and at least one second conductive terminal 72 configured to be opposite to the second electrode 42. The first conductive terminal 71 and the second conductive terminal 72 have upward elasticity and can elastically abut the first electrode 41 and the second electrode 42 when the second assembly portion 60 is assembled with the first assembly part 20, thereby maintaining a stable electrical connection.

The second assembly part 60 of the first light emitting module 3 includes a seat 61, and a plurality of convex buckles 62 upwardly protruding from the seat 61, and the top side 301 of the first light emitting module 3 is located on the seat 61, and provided for mounting the first conductive terminal 71 and the second conductive terminal 72.

When the first light emitting module 3 is assembled with the bottom side 105 of the solar light emitting module 2, the seat 61 can be inserted into the ring wall 22, allowing the plurality of convex buckles 62 to fit upward into the corresponding plurality of buckle slots 21 respectively. By then rotating the seat 61 relative to the ring wall 22, each convex buckle 62 can be buckled and positioned into place with its corresponding buckle slot 21, allowing the first light emitting module 3 to be stably assembled with the bottom side 105 of the solar light emitting module 2.

In the figures, there are two second conductive terminals 72, which can ensure that when the seat 61 is deflected relative to the ring wall 22, the second conductive terminal 72 can be electrically connected to the ring-shaped second electrode 42.

In one embodiment of the first light emitting module 3, the light emitting part 50 is located below the seat 61. The light emitting part 50 includes a light guide column 51 assembled below the seat 61. A long-strip LED light board 52 is arranged within the light guide column 51. The LED light board 52 is electrically connected to the plurality of conductive terminals 70. This allows the LED light board 52 to receive electric power from the battery 13 through the plurality of conductive terminals 70 and the conductive part 40 of the solar light emitting module 2, and evenly transmits light within the hollow column 1, offering different light emitting modes of the LED 12 of the solar light emitting module 2.

In addition, a switch 15 is further provided on the casing 10 of the solar light emitting module 2 and electrically connected to the circuit board 14. The switch 15 is provided for controlling the LED 12 to emit light in a steady, blinking, or color-changing manner.

With the structure above, users can choose to emit light by the LED 12 of the solar light emitting module 2 or combine the first light emitting module 3 with the solar light emitting module 2 to emit light by the first light emitting module 3, so that the garden light offers different light emitting modes and changes.

Figure 7:
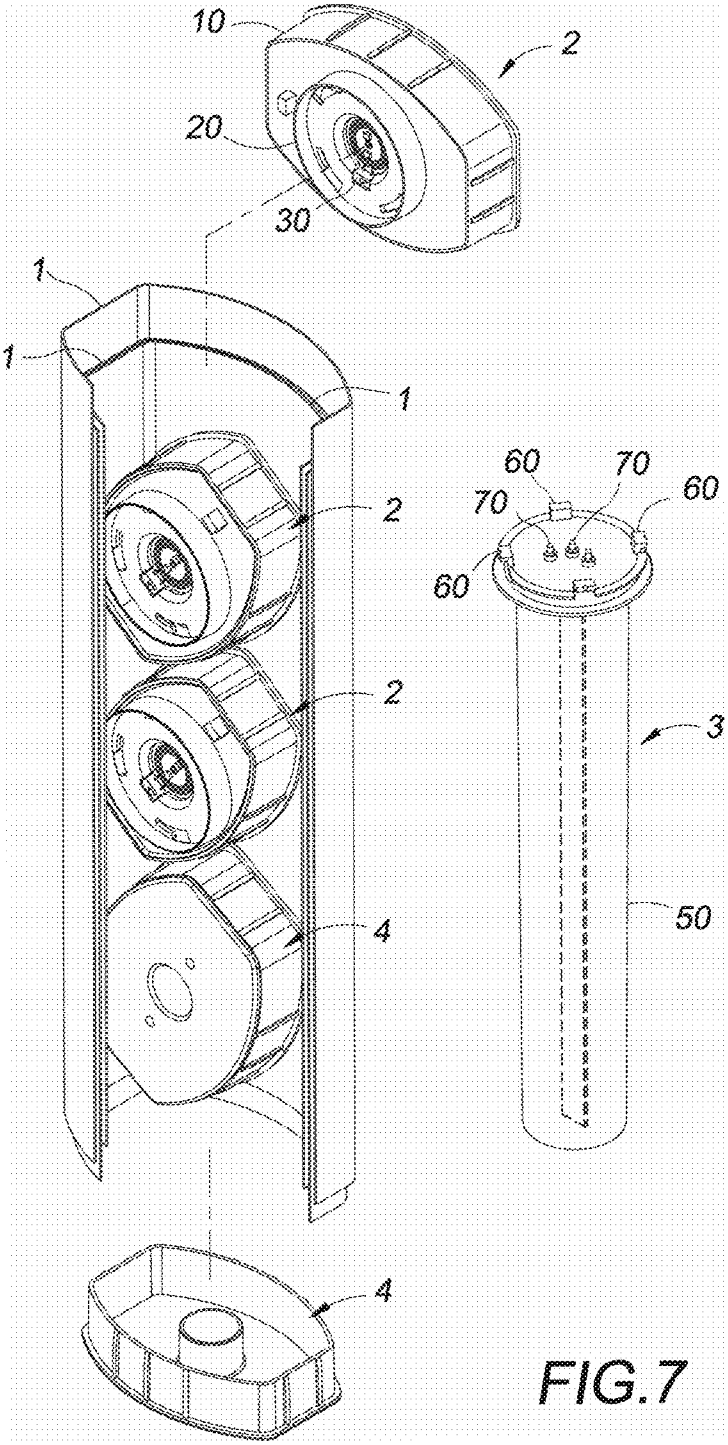
FIG. 7 is a first schematic view showing the packaging of different sized garden lights of the present disclosure.
Figure 8:
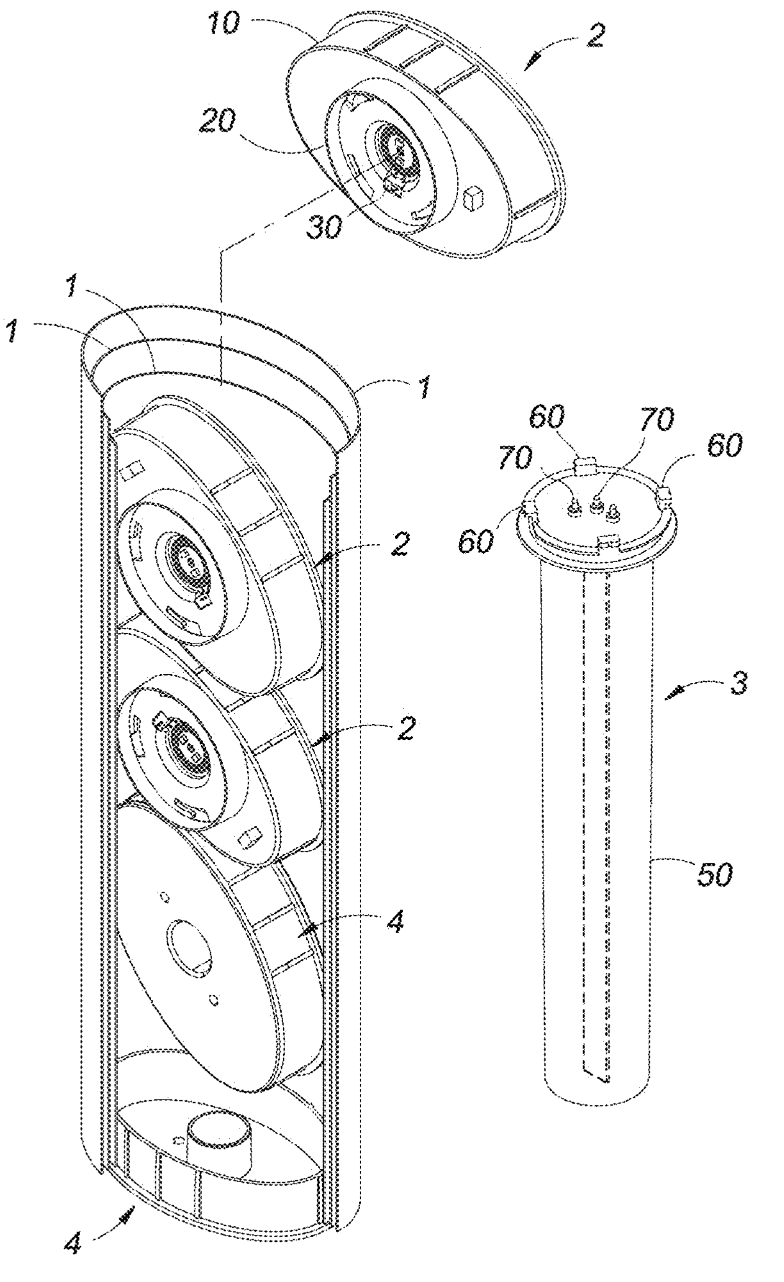
FIG. 8 is a second schematic view showing the packaging of different sized garden lights of the present disclosure.

It is noteworthy that FIGS. 1 to 6 illustrate a single garden light. As shown in FIGS. 7 and 8, the present disclosure is applicable to at least two garden lights of different sizes. Each hollow column 1, each solar light emitting module 2, and each base 4 utilize a modular design to integrate two garden lights of different sizes into a single package.

While the disclosure has been described by means of specific embodiments which are provided for illustrating the present disclosure only, but not intended for limiting the scope of the disclosure, and thus numerous modifications and variations with the same or similar objectives, structures, devices, and technical characteristics could be made thereto by those skilled in the art without departing from the scope and spirit of the disclosure as set forth in the claims.

What is claimed is:

1. A garden light, comprising a hollow column, a solar light emitting module, and a first light emitting module, wherein:

the hollow column has a bottom end and a top end, the top end is provided for mounting the solar light emitting module, and a translucent interior is defined between the top end and the bottom end;

the solar light emitting module comprises a casing having a top side and a bottom side, the top side is provided with a solar panel, a battery and a circuit board are accommodated between the top side and the bottom side and electrically coupled to the solar panel, and the bottom side is provided with at least one light emitting diode (LED) electrically coupled to the circuit board, so that after the at least one LED emits light downward, the light shines from an inside out through the translucent interior, characterized in that:

the bottom side of the casing is further provided with a first assembly part, a circuit breaker electrically coupled to the circuit board, and a plurality of conductive parts electrically coupled to the circuit board;

the first light emitting module has a top side, and a light emitting part extends downward from the top side of the first light emitting module;

wherein, the top side of the first light emitting module is provided with a second assembly part configured to be opposite to the first assembly part of the casing, the second assembly part is detachably assembled with the first assembly part, and the top side of the first light emitting module is provided with a plurality of conductive terminals configured to be opposite to the plurality of conductive parts of the casing respectively; and after the second assembly part of the first light emitting module is assembled with the first assembly part of the casing, the top side of the first light emitting module abuts against the circuit breaker to turn off the at least one LED, and the plurality of conductive terminals of the first light emitting module is in upward contact with the plurality of conductive parts of the casing respectively to allow the first light emitting module to receive electric power from the battery of the solar light emitting module, so as to enable the light emitting part of the first light emitting module to emit light in the translucent interior of the hollow column.

2. The garden light according to claim 1, wherein the plurality of conductive parts of the solar light emitting module comprises:

a first electrode, located at a middle of the bottom side of the casing, and a ring-shaped second electrode located around the first electrode, and the first assembly part is arranged at the periphery of the second electrode;

the plurality of conductive terminals of the first light emitting module comprises a first conductive terminal configured to be opposite to the first electrode, and at least one second conductive terminal configured to be opposite to the second electrode.

3. The garden light according to claim 2, wherein the first conductive terminal and the at least one second conductive terminal have an upward elasticity.

4. The garden light according to claim 2, wherein the first assembly part of the solar light emitting module comprises a plurality of buckle slots circularly arranged with the first electrode as the center and dividing the entire 360 degrees into equal parts, the second assembly part of the first light emitting module comprises a plurality of upwardly convex buckles; when the first light emitting module is assembled with the solar light emitting module, the plurality of upwardly convex buckles is first embedded into a corresponding plurality of buckle slots respectively, so that after the first light emitting module is deflected relative to the solar light emitting module, each upwardly convex buckle of the plurality of upwardly convex buckles is buckled and positioned with a corresponding buckle slot of the plurality of buckle slots.

5. The garden light according to claim 4, wherein the first assembly part of the solar light emitting module further comprises a ring wall located around the plurality of buckle slots, and formed by extending downward from the bottom side of the casing; the second assembly part further comprises a seat embeddable into the ring wall, the top side of the first light emitting module is located above the seat and provided for mounting the plurality of upwardly convex buckles and the plurality of conductive terminals.

6. The garden light according to claim 5, wherein the light emitting part of the first light emitting module comprises a light guide column assembled below the seat, the light guide column is provided with a long-strip LED light board therein, and the LED light board is electrically coupled to the plurality of conductive terminals.

7. The garden light according to claim 1, wherein the casing of the solar light emitting module is further provided with a switch arranged thereon and electrically coupled to the circuit board, and the switch is provided for controlling the at least one LED to emit light in a steady-on, blinking, or color-changing manner.

8. The garden light according to claim 1, wherein the bottom end of the hollow column is provided with a base, and a ground plug detachably arranged under the base.

* * * * *